INVENTORS
ROBERT RUPRECHT
ERICH SCHÄFTNER
BY Michael S. Striker
their ATTORNEY

United States Patent Office 3,444,749
Patented May 20, 1969

1

3,444,749
VARIABLE PITCH SHEAVE AND HELICAL
SPRING STRUCTURE
Robert Ruprecht, Aichelberg, Kreis Esslingen, and Erich
Schaftner, Stuttgart-Zuffenhausen, Germany, assignors
to Ernst Heinkel Aktiengesellschaft, Stuttgart-Zuffen-
hausen, Germany
Filed Feb. 21, 1967, Ser. No. 617,604
Claims priority, application Germany, Feb. 24, 1966,
H 58,638
Int. Cl. F16h 55/56
U.S. Cl. 74—230.17                                11 Claims

ABSTRACT OF THE DISCLOSURE

A helical compression spring with ring-shaped end portions which include the end convolutions of the metallic part of the spring and ring-shaped fillers of hardened synthetic plastic material. The end portions may be provided with axially and/or radially extending projections serving to transmit torque to the spring or to the parts between which the spring is installed to take up or transmit axial stresses during rotation about its axis.

Background of the invention

The present invention relates to helical springs in general, and more particularly to improvements in helical springs which can be utilized to effect axial movements of rotary bodies, for example, to urge the movable flange of a variable-pitch sheave toward the fixed flange.

It is already known to provide a variable-pitch sheave with a helical compression spring which operates between a retaining member and the movable flange and serves to urge the movable flange toward the fixed flange. The retaining member rotates with the shaft of the sheave and is engaged by one end convolution of the compression spring. The other end convolution bears against the movable flange, and the spring rotates with the retaining member about the axis of the shaft. Such sheaves are satisfactory at low rotational speeds. However, if the sheave is to operate at higher speeds, all of its elements must be properly centered or trued in order to eliminate unbalanced centrifugal forces which could cause vibration, noise and other undesirable phenomena as well as excessive wear. A serially produced helical spring exhibits differences in diameter which are highly undesirable. Such differences depend on the size of the spring and often amount to 2–3 mm. Therefore, a sheave utilizing a serially produced spring must be balanced with a view to eliminate all forces which would tend to destroy the equilibrium during rotation at high speeds. Such balancing is a costly and lengthy procedure and is successful only for a medium range of speeds. However, if the sheave is to be operated at speeds in the range of between 3,000 and 5,000 r.p.m., proper balancing of its parts is practically impossible so that such sheaves invariably generate noise and must be replaced at frequent intervals due to excessive wear upon their components.

Accordingly, it is an important object of the present invention to provide a novel and improved helical spring, particularly a so-called open helical compression spring, which is constructed and assembled in such a way that it can be properly balanced prior or subsequent to mounting in a variable-pitch sheave or in another device which is intended to rotate at high speeds.

Another object of the invention is to provide a helical spring of the just outlined characteristics which can be assembled of simple and readily available parts, which can be assembled at the locale of actual use or prior to mounting in a rotary device, and which can be utilized to transmit or to take up axial as well as torsional stresses.

2

A further object of our invention is to provide a helical compression spring of the above outlined characteristics with a novel envelope which protects its parts against dust, moisture and other foreign matter likely to affect the operation and/or to shorten the useful life of the spring.

An additional object of the invention is to provide a variable-pitch sheave or an analogous rotary device which embodies a helical spring of the above outlined characteristics.

A concomitant object of the instant invention is to provide a helical spring which can be permanently or removably installed in a variable-pitch sheave and which, once balanced prior or subsequent to mounting in the sheave, requires no further attention on the part of the operators.

Summary of the invention

Briefly outlined, one feature of our invention resides in the provision of a helical spring, particularly an open rotary helical compression spring. The spring comprises an intermediate portion including one or more helical convolutions and two end portions at least one of which constitutes a circumferentially complete annulus. In accordance with a presently preferred embodiment of our invention, both end portions constitute circumferentially complete annuli each of which includes an end convolution integral with the adjoining convolution of the intermediate portion and a ring of hardened synthetic resin.

The improved helical spring may be used to bias the movable flange of a variable-pitch sheave toward the fixed flange. The movable flange is then provided with an annular groove which receives one end portion of the spring and the shaft of the sheave carries a fixed retaining member which is provided with a second annular groove serving to receive the other end portion of the spring. The synthetic material may be poured directly into the grooves of the movable flange and retaining member, or the end portions of the spring can be formed in a suitable mold in which the synthetic material sets prior to mounting of the spring in the variable-pitch sheave.

The novel features which are considered as characteristic of the invention are set forth in particular in the appended claims. The improved spring itself, however, both as to its construction and its mode of operation, together with additional features and advantages thereof, will be best understood upon perusal of the following detailed description of certain specific embodiments with reference to the accompanying drawing.

Description of the preferred embodiments

Figure 1:
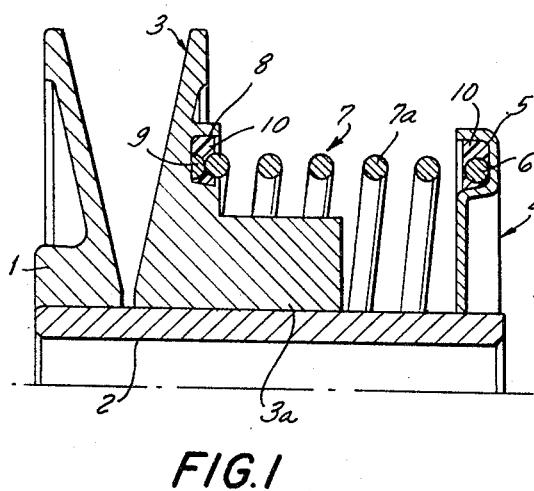
FIG. 1 is a fragmentary axial section through a variable-pitch sheave wherein the movable flange is biased toward the fixed flange by a helical compression spring which embodies one form of our invention.

Referring first to FIG. 1, there is shown a variable-pitch sheave which comprises a hollow shaft 2, a first flange 1 which is affixed to and rotates with the shaft 2, a second flange 3 which is coaxial with the flange 1 and is reciprocable axially of the shaft 2, a retaining member or stop 4 which resembles a disk and is axially spaced from the hub 3a of the movable flange 3, and a novel open helical compression spring 7 which operates between the retaining member 4 and movable flange 3 to urge the latter toward the fixed flange 1. The movable flange 3 may but need not be held against rotation with reference to the fixed flange and shaft 2. The belt which passes through the gap between the flanges 1 and 3 is not shown in the drawings. In a well known manner, the transmission ratio of the sheave will vary in response to axial displacement of the movable flange 3 toward or away from the fixed flange 1. The flanges 1, 3 may drive the shaft 2, or vice versa.

In accordance with the present invention, the movable flange 3 constitutes a retaining member for the helical compression spring 7 and is provided with an annular groove or recess 8 which is aligned with an annular groove or recess 5 of the retaining member 4. The spring 7 comprises an intermediate portion which includes a series of helical convolutions 7a and two circumferentially complete annular end portions each of which is received in and fills one of the grooves 5, 8. Each end portion of the spring 7 includes an end convolution 6 or 9 which is integral with the adjoining convolution 7a and a ring 10 consisting of hardened synthetic resin which fills the respective groove 5 or 8 and adheres to the respective end convolution and preferably also to the material of the flange 3 or retaining member 4.

During assembly of the variable-pitch sheave, the metallic component of the spring 7 is inserted between the movable flange 3 and retaining member 4 so that its end convolutions 6, 9 respectively enter the grooves 5 and 8. In the next step, the grooves 5 and 8 are filled with molten or deformable resin which is thereupon allowed to set and to form the rings 10. These rings respectively adhere to the end convolutions 6, 9 and preferably also to the retaining member 4 and flange 3. In the final step, the components of the sheave are properly balanced so that they do not vibrate in actual use. The spring 7 remains balanced during the entire useful life of the sheave.

Figure 2:
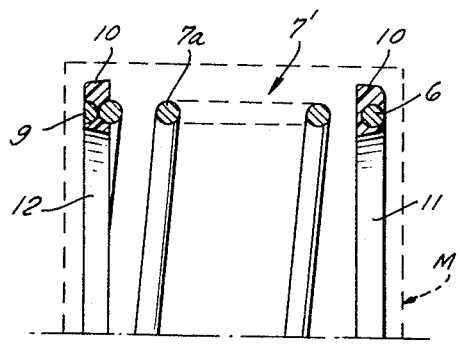
FIG. 2 is a fragmentary axial section through a fully assembled helical spring.

FIG. 2 illustrates a portion of a prefabricated helical compression spring 7' which is identical with the spring 7 of FIG. 1. However, its end portions are formed prior to insertion between the retaining members 3 and 4 of a variable-pitch sheave. Thus, the two end convolutions 6 and 9 are placed into the cavities of a suitable mold M (indicated by broken lines), and the cavities are then filled with molten or deformable resin which is allowed to harden and to form the rings 10. The configuration of the cavities in the mold M corresponds to the configuration of grooves 5 and 8 shown in FIG. 1. The resulting helical compression spring 7' is thereupon properly balanced prior to insertion of its end portions into the grooves 5 and 8 of the retaining members 4, 3 shown in FIG. 1. It is equally possible to install the spring 7' in FIG. 1. In FIG. 2, the two circumferentially complete annular end portions of the helical spring 7' are denoted by the reference numerals 11 and 12.

Figure 3:
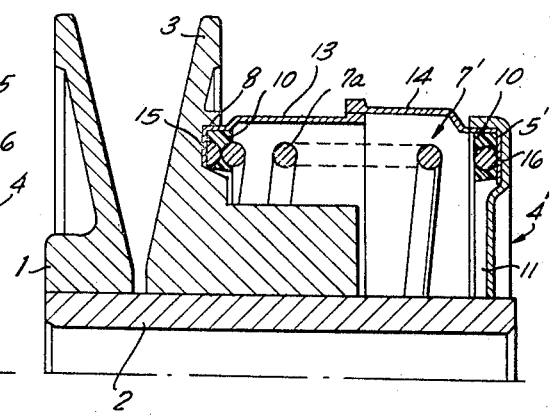
FIG. 3 is a fragmentary axial section through a second variable-pitch sheave wherein the helical spring is received in a protective envelope.

FIG. 3 shows a slightly modified variable-pitch sheave wherein the retaining members for the helical compression spring 7' are constituted by two collars 15, 16 provided at the opposite axial ends of a tubular envelope including two tubular shields or skirts 13, 14. Such end portions of the shields 13, 14 which are remote from the collars 15, 16 are telescoped into each other so that the length of the envelope can increase or decrease as a function of axial movement of the flange 3 toward or away from the fixed flange 1.

The spring 7' is assembled in a manner as described in connection with FIG. 2 and is thereupon installed between the flange 3 and stop 4'. The retaining members 15, 16 of the shields 13, 14 are respectively received in the grooves 8 and 5'. The sheave is balanced upon completed assembly, i.e., after insertion of the spring 7'.

The purpose of the envelope including the shields 13, 14 is to protect the spring 7' against dust, moisture and other foreign matter.

Figure 4:
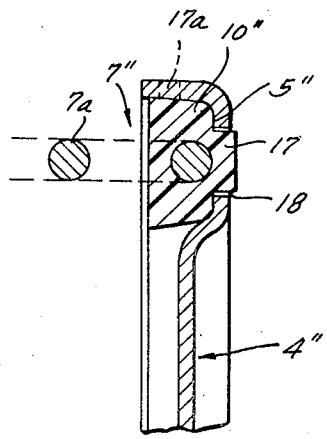
FIG. 4 is a fragmentary axial section through a further helical spring which can transmit torque.

It is also possible to utilize the improved helical spring as a means for transmitting torque from a first to a second rotary member, for example, from a retaining member to the movable flange 3 of a variable-pitch sheave. This is shown in FIG. 4 wherein the retaining member 4" has one or more recesses or openings 18 receiving motion transmitting projections 17 of the adjoining ring 10". Since the retaining member 4" is affixed to the shaft (not shown in FIG. 4), the projections 17 compel the spring 7" to rotate with the member 4". By providing the other ring 10" of the spring 7" with similar projections 17, the spring can drive the movable flange 3 so that all components of the sheave rotate as a unit but the movable flange 3 is free to move toward or away from the retaining member 4".

If desired, the ring 10" may be provided with radially extending motion transmitting projections (one such projection is shown in FIG. 4 by broken lines at 17a) extending into radial recesses opening into the groove 5" of the retaining member 4". Also, it is often sufficient to bound one or more sides of the groove 5" by a corrugated, milled, knurled or otherwise roughened surface so that the material of the ring 10" fills the unevennesses in such surface or surfaces and, once hardened, the ring transmits sufficient torque to drive the spring 7" in response to rotation of the retaining member 4", or vice versa. The manner in which the motion transmitting projection or projections on the non-illustrated left-hand ring 10" of the spring 7" transmit torque from the spring 7" to the movable flange or vice versa is analogous.

By having its end convolutions 6, 9 embedded in the rings 10 or 10", the spring of our invention together with the rings forms an operated unit which can be balanced per se in an exact manner. In a balanced system of other machine elements, the spring unit will remain exactly balanced, also if it should turn respectively to the machine elements.

The rings 10 or 10" may consist of polyvinylchloride, e.g. the PVC "Vestolit-70-SAO."

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A structure of the character described, particularly a variable-pitch sheave, comprising a first retaining member rotatable about a predetermined axis and having a first annular groove coaxial therewith; a second retaining member coaxial with said first retaining member and having a second annular groove coaxial with said axis, said second retaining member being rotatable about said axis and being movable axially with reference to said first retaining member; a helical spring interposed between said retaining members for rotation about said axis, said spring having an intermediate portion including at least one helical convolution and two circumferentially complete annular end portions each complementary to one of said grooves and being received therein; and a mass of hardened synthetic plastic material embedding each of said end portions in the respective associated groove.

2. A structure as defined in claim 1, wherein each of said end portions consists in part of synthetic plastic material.

3. A structure as defined in claim 2 wherein said plastic material is a hardened synthetic resin.

4. A structure as defined in claim 1, wherein said intermediate portion includes a plurality of helical convolutions and wherein each of said end portions includes an end convolution integral with said intermediate portion and a ring of hardened synthetic plastic material receiving the respective end convolution and constituting said mass.

5. A structure as defined in claim 1, wherein said retaining members form part of tubular shields extending toward each other to provide an envelope around said spring.

6. A structure as defined in claim 5, wherein said shields have end portions remote from the respective retaining members, the end portion of one of said shields being slidably telescoped into the end portion of the other shield.

7. A structure as defined in claim 1, further comprising torque transmitting means provided between at least one of said end portions and the respective retaining member.

8. A structure as defined in claim 7, wherein said torque transmitting means comprises at least one projection provided on said one end portion and extending into a recess provided in the respective retaining member.

9. A structure as defined in claim 1, wherein said predetermined axis is defined by a rotary shaft which is affixed to said first retaining member and reciprocably supports said second retaining member.

10. A structure as defined in claim 9, wherein said second retaining member is constituted by the movable flange of a variable-pitch sheave.

11. A structure as defined in claim 1, wherein said spring is balanced intermediate said retaining members and wherein said end portions thereof comprise rings of hardened synthetic plastic material which bonds said intermediate portion to said retaining members and constitutes said mass.

References Cited

UNITED STATES PATENTS

| 2,516,829 | 7/1950 | Reeves | 74—230.17 |
| 2,776,575 | 1/1957 | Michie | 74—230.17 |
| 2,842,355 | 7/1958 | Lang | 74—230.17 |
| 2,850,913 | 9/1958 | Lewellen et al. | 74—230.17 |
| 3,142,997 | 8/1964 | Rampe | 74—230.17 |

FOREIGN PATENTS 1,391,845  2/1965  France.

FRED C. MATTERN, JR., *Primary Examiner.*

JAMES A. WONG, *Assistant Examiner.*

U.S. Cl. X.R.

267—61